(12) United States Patent
Broadway et al.

(10) Patent No.: US 8,668,990 B2
(45) Date of Patent: Mar. 11, 2014

(54) HEAT TREATABLE FOUR LAYER ANTI-REFLECTION COATING

(75) Inventors: David M. Broadway, Northville, MI (US); Alexey Krasnov, Canton, MI (US); Willem Den Boer, Brighton, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 428 days.

(21) Appl. No.: 12/929,481

(22) Filed: Jan. 27, 2011

(65) Prior Publication Data

US 2012/0196133 A1 Aug. 2, 2012

(51) Int. Cl.
*C03C 17/40* (2006.01)
*C03C 17/34* (2006.01)

(52) U.S. Cl.
CPC ......... *C03C 17/3417* (2013.01); *C03C 17/3423* (2013.01)
USPC .......................................... 428/426; 428/428

(58) Field of Classification Search
None
See application file for complete search history.

(56) References Cited

U.S. PATENT DOCUMENTS

| | | | |
|---|---|---|---|
| 3,432,225 A | | 3/1969 | Rock |
| 3,736,047 A | | 5/1973 | Gelber et al. |
| 3,781,090 A | | 12/1973 | Sumita |
| 4,387,960 A | | 6/1983 | Tani |
| 5,891,556 A | * | 4/1999 | Anderson et al. ............. 428/216 |
| 6,074,730 A | | 6/2000 | Laird et al. |
| 6,238,781 B1 | * | 5/2001 | Anderson et al. ............. 428/216 |
| 6,586,102 B1 | | 7/2003 | Stachowiak |
| 6,589,657 B2 | | 7/2003 | Dannenberg |
| 6,692,832 B2 | | 2/2004 | Murphy |
| 6,924,037 B1 | | 8/2005 | Joret et al. |
| 6,972,136 B2 | | 12/2005 | Koenig et al. |
| 7,311,938 B2 | | 12/2007 | Koenig et al. |
| 7,588,823 B2 | | 9/2009 | Taylor |
| 2003/0165693 A1 | * | 9/2003 | Hartig et al. .................. 428/426 |
| 2005/0069717 A1 | * | 3/2005 | Stachowiak .................. 428/432 |
| 2005/0205998 A1 | * | 9/2005 | Yamada et al. ............... 257/751 |
| 2006/0087739 A1 | | 4/2006 | Ockenfuss et al. |
| 2006/0158738 A1 | * | 7/2006 | Nakamura et al. ............ 359/586 |
| 2006/0169316 A1 | | 8/2006 | Thomsen et al. |
| 2006/0210783 A1 | | 9/2006 | Seder et al. |
| 2006/0249199 A1 | | 11/2006 | Thomsen et al. |

(Continued)

FOREIGN PATENT DOCUMENTS

DE 10-329917 2/2005

OTHER PUBLICATIONS

U.S. Appl. No. 12/923,146, filed Sep. 3, 2010; Broadway et al.
U.S. Appl. No. 12/591,225, filed Nov. 12, 2009; Sharma et al.

(Continued)

*Primary Examiner* — David Sample
(74) *Attorney, Agent, or Firm* — Nixon & Vanderhye P.C.

(57) ABSTRACT

A coated article includes a heat treatable (e.g., temperable) antireflection (AR) coating having four layers. The AR coating includes a layer adjacent the glass substrate having an index of refraction substantially matching that of the glass substrate, and having a compressive residual stress. In certain example embodiments, the coating may include the following layers from the glass substrate outwardly: stress-reducing layer/medium index layer/high index layer/low index layer. In certain example embodiments, depending on the chemical and optical properties of the high index layer and the substrate, the stress-reducing layer of the AR coating is selected to cause a net compressive residual stress and thus improve the overall performance of the antireflection coating when the coated article is heat treated.

6 Claims, 4 Drawing Sheets

(56) References Cited

U.S. PATENT DOCUMENTS

| | | |
|---|---|---|
| 2007/0030569 A1 | 2/2007 | Lu et al. |
| 2007/0074757 A1 | 4/2007 | Mellott et al. |
| 2007/0116966 A1 | 5/2007 | Mellott et al. |
| 2007/0215205 A1 | 9/2007 | Thomsen et al. |
| 2008/0185041 A1 | 8/2008 | Sharma et al. |
| 2008/0192335 A1* | 8/2008 | Zaczek et al. ............... 359/359 |
| 2009/0010203 A1 | 1/2009 | Pratt, Jr. et al. |
| 2009/0025776 A1 | 1/2009 | Varaprasad |
| 2009/0025777 A1 | 1/2009 | Varaprasad |
| 2009/0032098 A1 | 2/2009 | Lu |
| 2009/0075092 A1 | 3/2009 | Varaprasad |
| 2009/0101209 A1 | 4/2009 | Sharma et al. |
| 2009/0133748 A1 | 5/2009 | Sharma |
| 2009/0148709 A1* | 6/2009 | Disteldorf et al. ............ 428/428 |
| 2009/0176107 A1 | 7/2009 | Sharma |
| 2009/0217978 A1 | 9/2009 | Thomsen et al. |
| 2009/0223252 A1 | 9/2009 | Fulton et al. |
| 2010/0122728 A1 | 5/2010 | Fulton et al. |
| 2010/0255980 A1 | 10/2010 | Fulton et al. |
| 2011/0081532 A1 | 4/2011 | Lu |
| 2011/0157703 A1 | 6/2011 | Broadway et al. |
| 2012/0057236 A1* | 3/2012 | Broadway et al. ............ 359/586 |

OTHER PUBLICATIONS

U.S. Appl. No. 12/385,318, filed Apr. 3, 2009; Fulton et al.

* cited by examiner

HEAT TREATABLE FOUR LAYER ANTI-REFLECTION COATING

Certain example embodiments of this invention relate to a coated article including a heat treatable (e.g., temperable) anti-reflection coating, and/or a method of making the same. In certain example embodiments, a heat treatable (e.g., temperable) anti-reflection (AR) coating utilizes materials having a higher magnitude of compressive stress in connection with high index layer(s) that are prone to tensile stress upon heat treatment. These materials having a higher magnitude of compressive stress are utilized in order to help reduce the net tensile stress (e.g., reduce the tensile stress to a lower value of tensile stress and/or reduce the tensile stress to the point that the stress is compressive rather than tensile) of the overall coating. In certain example embodiments, the thicknesses and types of stress in each layer may be optimized in order to produce a heat treatable (e.g., temperable), four layer AR coating.

BACKGROUND AND SUMMARY OF CERTAIN EXAMPLE EMBODIMENTS OF THE INVENTION

Anti-reflection (AR) coatings are known in the art. For example, AR coatings in the visible range are widely used on glass in electronics, lighting, appliances, architectural, and display applications. However, in many of these applications, tempered or heat-strengthened glass may be required. Tempering or heat strengthening of the glass is sometimes done prior to the deposition of the AR coating to avoid unwanted changes in the optical, mechanical, or aesthetic quality of the coating as a consequence of exposing the coating to the high temperatures required for tempering and other forms of heat treatment. However, this "temper then coat" method may be undesirable in certain circumstances. Thus, it will be appreciated that there exists a need in the art for improved AR coatings (e.g., temperable AR coatings) for coated articles such as windows and the like.

In certain example embodiments, coatings may suffer from a lack of durability, particularly after heat treatment and/or thermal tempering, due to a residual net tensile stress that is too high. A large enough net tensile stress in a layer stack may cause aesthetic degradation of the coating (e.g., cracking), especially after a heat strengthening and/or tempering process.

Those skilled in the art thus will appreciate that there also is a need for improved durability in anti-reflection coatings.

In certain example embodiments of this invention, there is provided a method of making a heat treatable coated article comprising an anti-reflection coating, the method comprising: disposing a stress-reducing layer over and contacting a glass substrate, the stress-reducing layer having an index of refraction that substantially matches an index of refraction of the glass substrate; disposing a layer having a medium index of refraction over the stress-reducing layer; disposing a layer having a high index of refraction over the medium index layer; disposing a layer having a low index of refraction over the high index layer, where the index of refraction of the high index layer is greater than those of the medium and low index layers, and the index of refraction of the low index layer is less than that of the medium index layer; and wherein a net residual stress of the anti-reflection coating is compressive (e.g., following optional heat treatment).

In certain example embodiments of this invention, there is provided a method of making a heat treatable coated article comprising an anti-reflection coating, the method comprising: disposing a stress-reducing layer over and contacting a glass substrate, the stress-reducing layer comprising an oxide and/or nitride of silicon, and having an index of refraction that differs from an index of refraction of the glass substrate by no more than about 0.2; disposing a layer comprising silicon oxynitride over the stress-reducing layer; disposing a layer comprising an oxide of niobium over the layer comprising silicon oxynitride; disposing a layer comprising an oxide of silicon over the layer comprising an oxide of niobium; and wherein the index of refraction of the high index layer is greater than those of the medium and low index layers, and the index of refraction of the low index layer is less than that of the medium index layer, and wherein a net residual stress of the coating is compressive.

In certain example embodiments of this invention, there is provided a heat treatable coated article comprising: an anti-reflection coating supported by a major surface of a substrate, the substrate being heat treatable together with the antireflection coating, wherein the antireflection coating comprises, in order moving away from the substrate: a stress-reducing layer comprising a material having a compressive residual stress after heat treatment; a medium index layer comprising silicon oxynitride; a high index layer comprising an oxide of niobium, and a low index layer comprising an oxide of silicon, wherein the coating has a net compressive residual stress (e.g., following heat treatment).

In certain example embodiments of this invention, there is provided a heat treated coated article comprising: an antireflection coating supported by a major surface of a substrate, the substrate being heat treated together with the antireflection coating, wherein the antireflection coating comprises, in order moving away from the substrate: a stress-reducing layer comprising an oxide and/or nitride of silicon; a medium index layer comprising silicon oxynitride; a high index layer comprising an oxide of niobium, and a low index layer comprising an oxide of silicon, wherein the coating has a net compressive residual stress after heat treatment.

In certain example embodiments, the same or similar antireflective coatings may be provided on one or both major surfaces of the glass substrate.

The features, aspects, advantages, and example embodiments described herein may be combined to realize yet further embodiments.

DETAILED DESCRIPTION OF CERTAIN EXAMPLE EMBODIMENTS OF THE INVENTION

Figure 1:
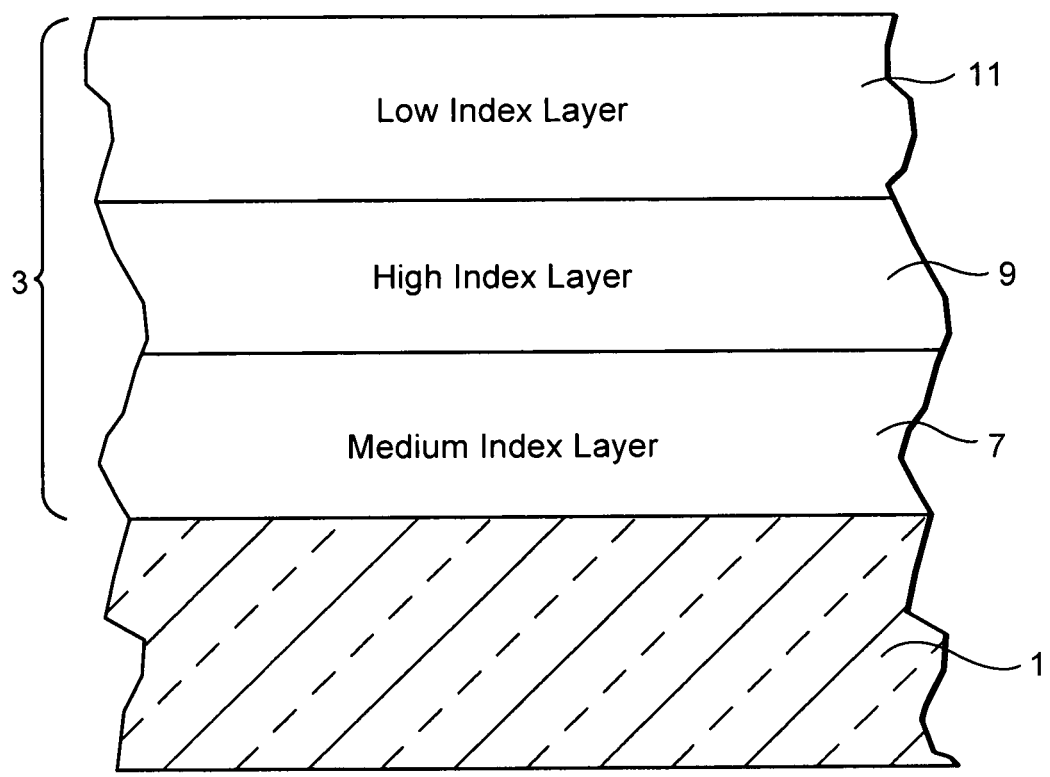
FIG. 1 is a cross-sectional view of a three-layered antireflection coating.

Referring now more particularly to the accompanying drawings in which like reference numerals indicate like parts throughout the several views.

Certain example embodiments of this invention relate to a coated article including an antireflective coating, and/or a method of making the same. In certain example embodiments, a heat treatable (e.g., temperable) anti-reflection (AR) coating is provided.

AR coatings with antireflective properties in the visible range are widely used on glass in electronics, lighting, appliances, architectural, display applications, and other applications. Although tempering or heat strengthening of the glass is sometimes done prior to the deposition of the AR coating to avoid unwanted changes in the optical, mechanical, or aesthetic quality of the coating as a consequence of exposing the coating to the high temperatures required for tempering and other forms of heat treatment, there are drawbacks associated with the "temper then coat" method under certain example circumstances. For example, tempering prior to coating may be undesirable for large area coaters. The final size of the tempered/heat treated substrate to be coated may be of a dimension that does not efficiently employ the large area coating capability, which is useful when attempting to increase or achieve the high efficiencies possible by virtue of high volume glass coating manufacturing techniques. Therefore, it will be appreciated that an antireflective coating (e.g., a four-layer AR coating) that can be tempered and/or heat treated while preserving its aesthetic quality and high chemical and mechanical durability after exposure to temperatures typically encountered in tempering and/or heat treating environments would be advantageous.

Existing AR coatings may not be sufficiently heat treatable (e.g., temperable) in certain example embodiments, e.g., in the sense that such coatings may not survive the tempering or heat strengthening process in a usable or desirable form. As one example, it is noted that some materials utilized in AR coatings may have high tensile residual stress after exposure to temperatures greater than, for example, 300 degrees C. When the tensile residual stress of one layer is so high such that it results in a net tensile stress in the multilayer stack, this stress may be sufficient to cause an aesthetic degradation of the coating. This and/or similar problems may, for example, result in the cracking of the coating. Therefore, it may be advantageous to reduce the tensile residual stress in a layer in an AR coating.

When a material is subjected to tensile stress, the material may suffer stretching or elongation. Accordingly, if too much tensile residual stress is present in a layer in a coating, the layer and/or coating may suffer deformation or cracking in certain instances, which may cause the aforesaid degradation of the coating. On the other hand, compressive stress, when applied, acts toward the center of a material. Thus, when a material is subjected to compressive stress, the material is under compression. Therefore, in certain example embodiments, it may be more desirable for a coating to have a net compressive residual stress rather than a net tensile residual stress.

FIG. 1 is a cross-sectional view of an example coated article according to an example embodiment of this invention. The coated article of the FIG. 1 embodiment includes substrate 1 that supports heat treatable (e.g., temperable) AR coating 3. Substrate 1 is typically a glass substrate (e.g., clear, green, bronze, or blue-green glass substrate from about 1.0 to 10.0 mm thick), but may be other materials in certain example instances such as, for example, a polycarbonate or acrylic material, a silicon wafer, etc. The AR coating 3 includes medium index layer 7, high index layer 9, and low index layer 11.

In certain example embodiments, layers having high indices of refraction are associated with a tensile residual stress induced during heat treatment. Therefore, in order improve the durability and/or other properties of a temperable antireflection coating comprising at least one layer with a high index of refraction, it may be advantageous to reduce and/or offset the tensile stress of the high index layer in certain example embodiments.

Tables 1 and 2 illustrate the correlation between cracking of a three-layered AR coating and the net post-heat treatment residual stress in layer stacks after heat treatment at 550 degrees C. for approximately 10 minutes in certain example embodiments. In the comparative examples listed in Tables 1 and 2, $TiO_x$ has been used as the high index material. However, other example embodiments of the invention are not so limited.

In order to test the incidence of cracking, in Comparative Examples 1-5, layer stacks were deposited on the Sn side of a glass substrate. In these examples, the thicknesses of the silicon oxynitride and the silicon oxide-based layers were kept substantially constant for each example, whereas the thicknesses of the high index layers (here, $TiO_x$) were varied within a range of 20 to 100 nm.

Based on these examples, in certain embodiments, cracking may not occur and/or the incidence of cracking may be reduced if the net stress in the layer stack is zero or compressive. By convention, the compressive stress is denoted as negative, and tensile stress is denoted as positive.

TABLE 1

| Comparative Example | $SiO_x$ (nm) | $TiO_x$ (nm) | $SiO_xN_y$ (nm) | Total Thickness |
|---|---|---|---|---|
| 1a | 84.9 | 111.7 | 70.2 | 266.8 |
| 2a | 82.5 | 71.9 | 73.0 | 227.3 |
| 3a | 82.5 | 46.1 | 73.0 | 201.6 |
| 4a | 82.5 | 21.5 | 73.0 | 177.0 |
| 5a | — | — | 72.4 | — |

TABLE 2

| Comparative Example | As-Coated | | | Post HT (650 C., 10 min) | | | |
|---|---|---|---|---|---|---|---|
| | $\Sigma_x$, MPa | $\Sigma_y$, MPa | Avg. | $\Sigma_x$, MPa | $\Sigma_y$, MPa | Avg. | Cracking? |
| 1a | −136.7 | −124.7 | −130.7 | 204.9 | 191.4 | 198.2 | Yes |
| 2a | −225.4 | −214.9 | −222.3 | 85.5 | 81.4 | 81.0 | Yes |
| | −222.6 | −226.2 | | 70.1 | 87.1 | | |
| 3a | −255.6 | −251.0 | −259.1 | 6.5 | 10.95 | 7.1 | No |
| | −268.5 | −261.4 | | 12.0 | −1.0 | | |
| 4a | −298.9 | −291.0 | −293.9 | −97.4 | −107.1 | −101.1 | No |
| | −295.7 | −290.0 | | −98.6 | −101.3 | | |
| 5a | −565.2 | −562.8 | −570.7 | −324.7 | −340 | −343.2 | N/A |
| | −622.9 | −531.7 | | −375.7 | −332.1 | | |

As can be seen from Tables 1 and 2, when there is very little residual tensile stress and/or compressive stress as the net residual stress in the layer stack after heat treatment, the coating may be less inclined to crack in certain example instances. Accordingly, it would be desirable to reduce net tensile stress of a layer stack, as this may in turn reduce the likelihood of the coating cracking in certain example embodiments.

Further, from Comparative Example 5a, for example, it can be seen that the net residual stress of a single layer comprising silicon oxynitride is compressive. In fact, the stress of a layer comprising silicon oxynitride with a thickness as shown for Comparative Example 5a in the above example has a very large compressive stress. In certain example embodiments, when paired with layers having less compressive residual stress and/or tensile stress, the overall coating may still exhibit a net compressive stress due the large compressive stress of the silicon oxynitride-based layer.

There are several approaches possible when attempting to reduce the net tensile residual stress in a layer stack. In certain example embodiments, the thickness of the high index layer(s) may be reduced, thereby reducing the total tensile stress in the layer stack. In other example embodiments, a high index layer having a lower post-heat treatment tensile stress may be used instead of a high index layer with a higher post-heat treatment tensile stress. In further example embodiments, the magnitude of compressive stress in the other layers may be increased in order to further offset and/or balance the residual tensile stress in the high index layer. The aforesaid methods for reducing the net tensile residual stress may be used alone or in combination with other methods.

In certain example embodiments, if the thickness of the high index layer is too small, the optical performance of the coating may be compromised (e.g., some loss of color neutrality). This may be due in some instances to a narrower spectral bandpass that results when the high index material is thinner. Thus, for optical reasons, it may be advantageous to provide an antireflection coating having a high index layer with a physical thickness of from about 50 to 250 nm, more preferably from about 75 to 125 nm, even more preferably from about 80 to 120 nm, with a non-limiting example being at least about 100 nm.

Replacing a high index layer having a higher residual tensile stress after heat treatment (e.g., $TiO_x$) with a high index layer having a lower residual tensile stress after heat treatment and/or increasing the magnitude of compressive stress in the other layers of the stack may be advantageous in that the durability of the coating after heat treatment may be improved in certain cases. It would be further advantageous to have the means to theoretically predict the net residual stress of several designed layer stacks, in order to identify materials and stack designs with the least likelihood of cracking after heat treatment.

In certain example embodiments, such theoretical prediction is possible based on the individual bending moments and curvatures of each layer and/or film in the coating.

More specifically, for sequentially deposited films, each film introduces a separate bending moment which results in a separate curvature in certain cases. Since the bending moments are additive, so are the curvatures, in certain example embodiments.

From repeated application of Stoney's equation, the following equation is obtained:

$$\Delta\left(\frac{1}{R_1}\right) + \Delta\left(\frac{1}{R_2}\right) + \ldots + \Delta\left(\frac{1}{R_n}\right) = \frac{6(1-v_s)}{E_s h_s^2}(\sigma_1 h_1 + \sigma_2 h_2 + \ldots + \sigma_n h_n), \quad (1)$$

where $\sigma_n$ is the residual stress of the $n^{th}$ layer, and $h_n$ is the thickness of the $n^{th}$ layer, and together these variables result in a change of curvature, which is $\Delta(R^{-1}_n)$. $v_s$ is the Poisson Modulus, and $E_s$ is Young's Modulus. After further simplification of the above equation, the rule for the addition of stress within a layer stack is given by the following equation (Equation 2) if the stress of each layer for a given thickness is known.

$$\sigma_{Net} = \frac{\sigma_1 h_1 + \sigma_2 h_2 + \ldots + \sigma_n h_n}{h_1 + h_2 + \ldots + h_n}. \quad (2)$$

Table 3 below illustrates the validity of Equation 2 by comparing the calculated net residual stress in the stack with the measured value for another example stack. In certain example embodiments, the calculated value may vary from the measured value by less than or equal to about 20%, more preferably by less than or equal to about 15%, and in certain exemplary embodiments, by less than or equal to about 13%. It will be appreciated that this discrepancy between the calculated and measured values in Table 3 is reasonably within the error of the stress values obtained from measurement in certain examples.

TABLE 3

| Material | Σ, MPa/nm | Adjusted for thickness h, nm | $\sigma_1$ = hΣ, MPa | $\Sigma_{Net}$, MPa Calc. | Meas. |
|---|---|---|---|---|---|
| SiOx | −1.37 | 102.8 | −140.8 | −69.6 | −60 |
| NbOx | 3.35 | 105.3 | 352.8 | | |
| SiOxNy | −3.95 | 106.2 | −419.5 | | |

In the calculations illustrated in Table 3, a proportional relationship between residual stress and layer thickness was assumed, and the difference between calculated and measured values was about 13%. However, in other example embodiments, this dependence may not be strictly proportional. In fact, in certain instances, the relationship between residual stress and layer thickness may be better approximated by including a first order component in the relationship. However, this may not be necessary or desired in other example embodiments.

Table 4 illustrates experimentally determined values of residual stress measured on an Si wafer after heat treatment at 650 degrees C. for 10 min. These values were normalized by layer thickness. In certain examples, a proportional relationship between the residual stress and various physical thicknesses was assumed. The highlighted values indicate the normalized residual stress value(s) that will be used in the calculations that follow.

TABLE 4

| | Deposition Parameters | | | | | Heat Treated: 650 degrees C., 10 min. | | | |
|---|---|---|---|---|---|---|---|---|---|
| Ex. Material | $O_2$ | A | P (kW) | ISPD | Pass | h, nm | $\sigma_{avg}$, MPa | $\Sigma_{avg}$, MPa/nm | Avg |
| 1b NbO$_x$ | 60 | 40 | 2.5 | 30 | 20 | 87.9 | 294 | *3.35* | |
| 2b NbO$_x$ | 60 | 40 | 1 | 30 | 10 | 177.0 | 422 | 2.38 | |
| 3b SiO$_x$N$_y$ | 10 | 10 | 2.5 | 30 | 8 | 107.0 | −423 | −3.95 | |
| 4b SiO$_x$N$_y$ | 10 | 10 | 2.5 | 30 | 8 | 106.2 | −60 | N/A | |
| NbO$_x$ | 60 | 40 | 2.5 | 30 | 26 | 105.3 | | | |
| SiO$_x$ | 40 | 10 | 2.5 | 30 | 15 | 102.8 | | | |
| 5b SiO$_x$ | | | G49 | | | 86.4 | −119 | *-1.37* | |
| 6b SiO$_x$N$_y$ | | | | | | 72.4 | −343 | −4.74 | |
| 7b SiO$_x$N$_y$ | | | | | | 71.4 | −227 | −3.18 | *-3.96* |

Table 5 illustrates the optical performance and calculated post-heat treated stress values for the various thicknesses indicated above. For the calculation of the optical quantities, a refractive index of about 1.75 was used for the silicon oxynitride-based layer, a refractive index of above 1.48 for the silicon oxide-based layer, and a refractive index of about 2.3 for the niobium oxide-based layer were used in the calculation. The calculated stress values predict a risk of cracking after heat treatment in certain example embodiments, despite the substitution of TiOx with a lower tensile stress material such as NbOx.

TABLE 5

| Material | h, nm | $\Sigma_1$ (MPa/nm) | $\sigma_1 = h\Sigma$, MPa | $\sigma_{Net}$, MPa | Normal Inc. | R | T |
|---|---|---|---|---|---|---|---|
| SiO$x$ | 83 | −1.37 | −113.7 | 19.4 | Y | 0.46 | 98 |
| NbO$x$ | 96 | 3.35 | 321.6 | | a* | 8.3 | −1.3 |
| SiO$x$N$y$ | 65 | −3.95 | −256.8 | | b* | −13 | 0.6 |
| SiO$x$ | 82 | −1.37 | −112.3 | 31.3 | Y | 0.53 | 97.9 |
| NbO$x$ | 96 | 3.35 | 321.6 | | a* | 0.35 | −0.93 |
| SiO$x$N$y$ | 60 | −3.95 | −237.0 | | b* | −5.2 | 0.22 |
| SiO$x$ | 80 | −1.37 | −109.6 | 50.7 | Y | 0.72 | 97.7 |
| NbO$x$ | 97 | 3.35 | 325.0 | | a* | −8 | −0.57 |
| SiO$x$N$y$ | 53 | −3.95 | −209.4 | | b* | 0.32 | −0.02 |

Accordingly, in addition to and/or instead of replacing the high index layer with a layer comprising a lower tensile stress material, an additional layer may be utilized.

In certain example embodiments, a fourth layer may be used in an AR layer stack in order to reduce the net residual tensile stress of the layer stack and/or increase the net residual compressive stress. In certain examples, a four layer AR coating may comprise an index matching layer adjacent to the glass substrate. The index matching layer may have an index of refraction close to that of the glass substrate. For example, the layer may have an index of refraction from about 1.35 to 1.65, more preferably from about 1.4 to 1.6, and most preferably from about 1.45 to 1.55. Further, the stress-reducing layer may comprise an index of refraction differing from that of the glass substrate by no more than about 0.2, more preferably no more than about 0.1, and most preferably no more than about 0.05. In certain non-limiting embodiments, the stress-reducing, index-matching layer may comprise silicon oxide and/or silicon oxynitride.

In certain example embodiments, this index matching layer may serve an additional purpose of compensating for the tensile stress of the high index layer. In other words, in certain cases, the index matching layer may also be a stress reducing layer. This index matching and/or stress reducing layer may comprise a material having an index of refraction that substantially matches that of the glass substrate, and that also has a net compressive stress, in certain example embodiments.

Figure 2:
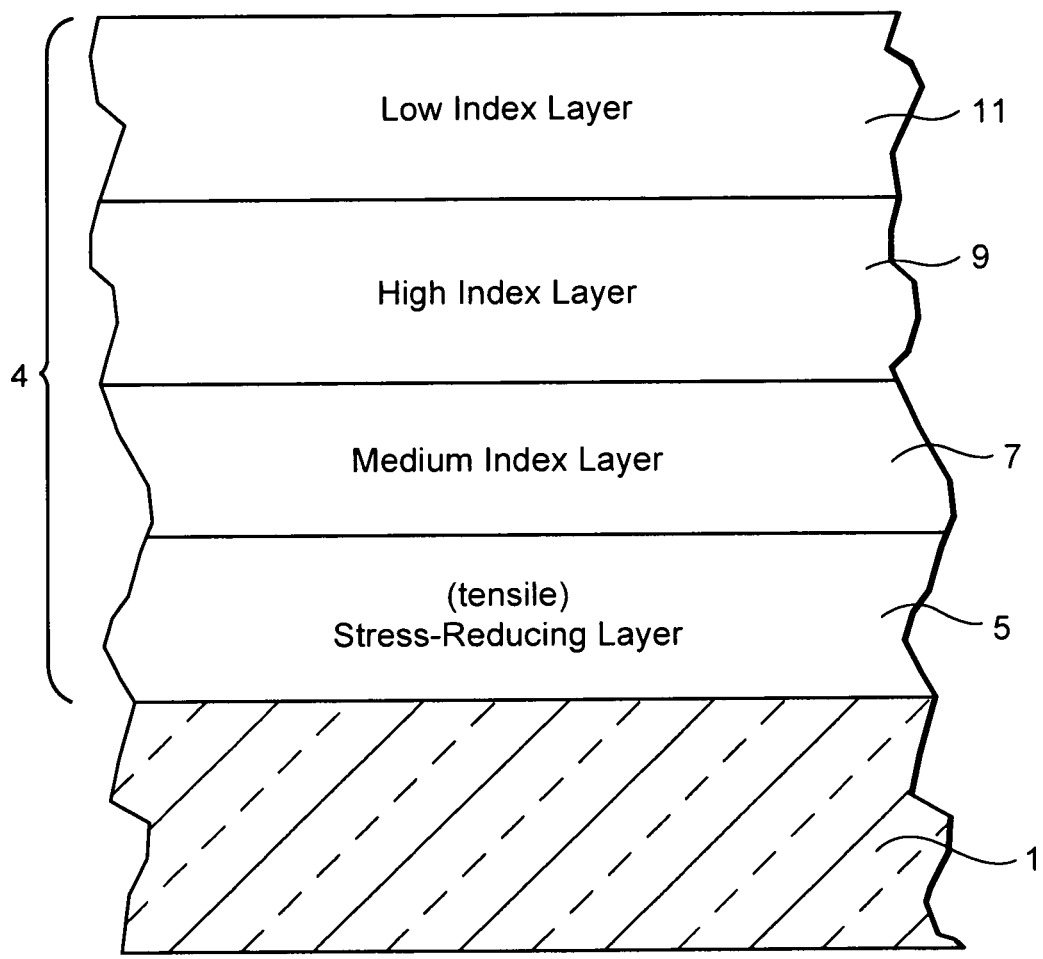
FIG. 2 is a cross-sectional view of a four-layered antireflection coating according to certain example embodiments.

FIG. 2 is a cross-sectional view of an example coated article according to an embodiment of this invention. The coated article of the FIG. 2 embodiment includes substrate 1 that supports heat treatable (e.g., temperable) anti-reflection (AR) coating 4. Substrate 1 is typically a glass substrate (e.g., clear, green, bronze, or blue-green glass substrate from about 1.0 to 10.0 mm thick), but may be other materials in certain example instances such as, for example, a polycarbonate or acrylic material, a silicon wafer, etc. The AR coating 4 includes an "index-matching" and/or "stress-reducing" layer 5, medium index layer 9, high index layer 9, and low index layer 11.

In certain example embodiments, layer 5 may comprise a material with a refractive index substantially matching that of a glass substrate. In certain cases, even if the refractive index of layer 5 does not match that of the glass substrate exactly, it still may have a refractive index sufficiently close enough such that any impact to optical performance can be reduced with slight modification to a thickness(es) of one or more other layers in the stack. Moreover, the thickness of layer 5 may be increased in certain instances as necessary, e.g., to add a sufficient component of compressive stress to the layer stack after heat treatment.

In certain example embodiments, layer 5 may comprise silicon oxide and/or silicon oxynitride. However, the invention is not so limited, and layer 5 may comprise any material having a refractive index that substantially matches that of the glass substrate. By "substantially matches," it is meant that the refractive index of the layer is within about 0.2 of the refractive index of the glass substrate, more preferably within about 0.1, and most preferably the difference is no greater than about 0.05 or 0.04.

Furthermore, in certain example embodiments, layer 5 may have a thickness of from about 50 to 300 nm, more preferably from about 60 to 120 nm, and most preferably from about 60 to 100 nm. However, a layer having any thickness sufficient to turn the net stress of the coating into compressive stress without significantly degrading the optical and/or physical characteristics of coating may be used in other example embodiments.

Layer 7 may be of or include a material having a "medium" index of refraction in certain example embodiments. The refractive index of layer 7 may be lower than that of layer 11, but higher than that of layer 9. In certain example embodiments, the refractive index of layer 7 may also be higher than the refractive index of layer 5.

In certain example embodiments, layer 7 may have a thickness of from about 30 to 150 nm, more preferably from about 40 to 80 nm, and most preferably from about 50 to 70 nm, with an exemplary thickness range being from about 53-65 nm.

Layer 7 may comprise silicon oxynitride in certain example embodiments; however, the invention is not so limited. Layer 7 may comprise any material having a refractive index from about 1.6 to 2.0, more preferably from about 1.65 to 1.95, and most preferably from about 1.7 to 1.8 or 1.9.

Layer 9 may be of or include a material having a comparatively "high" index of refraction in certain example embodiments. The refractive index of layer 9 may be greater than that of the other three layers making up the AR coating. In certain example embodiments, layer 9 may have a refractive index of from about 2.0 to 2.6, more preferably from about 2.1 to 2.5, and most preferably from about 2.2 to 2.4.

In certain example embodiments, layer 9 may have a thickness of from about 50 to 150 nm, more preferably from about 75 to 125 nm, even more preferably from about 80 to 120 nm, and most preferably from about 85 to 105 nm.

In other example embodiments, however, layer 9 may be thinned in order to reduce the net tensile stress of the AR coating, e.g., such that layer 9 has a thickness of less than about 50 nm, or even less than about 25 nm in some instances.

In further example embodiments, layer 9 may comprise a high index material having a lesser tensile stress value, before and/or after heat treatment. Layer 9 may comprise an oxide of niobium in some instances. In other instances, layer 9 may comprise an oxide of titanium. In further example embodiments, layer 9 may comprise any suitable, high index material.

Layer 11 may be of or include a material having a "low" index of refraction. In certain example embodiments, layer 11 may have an index of refraction that is lower than that of both layers 7 and 9. In some cases, layer 11 may even have an index of refraction lower than that of layer 5. In certain examples, the refractive index of layer 11 may be from about 1.3 to 1.6, more preferably from about 1.35 to 1.55, and most preferably from about 1.43 to 1.52.

In certain example embodiments, layer 11 may comprise silicon. In some cases, layer 11 may comprise silicon oxide and/or silicon oxynitride. Layer 11 may have a thickness of from about 40 to 200 nm, more preferably from about 50 to 110 nm, and most preferably from about 60 to 100 nm, with an example thickness being around 80 nm.

In some example embodiments, layers 5 and 11 may comprise similar thicknesses, and/or may even comprise substantially the same thickness. Layers 5 and 11 may differ from each other in thickness by no more than about 15 nm, more preferably no more than about 10 nm, and most preferably no more than about 5 nm, according to certain example embodiments.

An example embodiment of a coated article made according to FIG. 2 is illustrated in Table 6. As can be seen from Table 6, with the inclusion of an additional index-matching/stress-reducing layer, a coating including an additional layer with a higher magnitude of compressive stress has a lower overall net stress. In fact, in Example 1c, a three-layered AR coating, the net stress is tensile, but in Example 2c, the four-layered AR coating, the net stress is compressive. Thus, in certain example embodiments, a coating made with an additional layer having a greater compressive stress may be more durable than a three-layered AR coating.

TABLE 6

| Material | h, nm | $\Sigma_l$ (MPa/nm) | $\sigma_l = h\Sigma_l$ MPa | $\sigma_{Net}$ MPa | Normal Inc. | R | T |
|---|---|---|---|---|---|---|---|
| Ex. 1c | | | | | | | |
| SiOx | 79 | −1.37 | −108.2 | 32.8 | Y | 0.61 | 97.8 |
| NbOx | 94 | 3.35 | 314.9 | | a* | −.51 | −0.9 |
| SiOxNy | 55 | −3.95 | −217.3 | | b* | −0.12 | −1.01 |
| Ex. 2c | | | | | | | |
| SiOx | 78 | −1.37 | −112.3 | −4.9 | Y | 0.71 | 97.7 |
| NbOx | 90 | 3.35 | 321.6 | | a* | −2.9 | −0.79 |
| SiOxNy | 54 | −3.95 | −237.0 | | b* | 0.376 | −0.03 |
| SiOx | 80 | −1.37 | −109.6 | | | | |

In certain example embodiments the index-matching/stress-reducing layer 5 may be adjacent to the glass substrate. In other example embodiments, layer 5 may be provided elsewhere in the stack.

Figure 3:
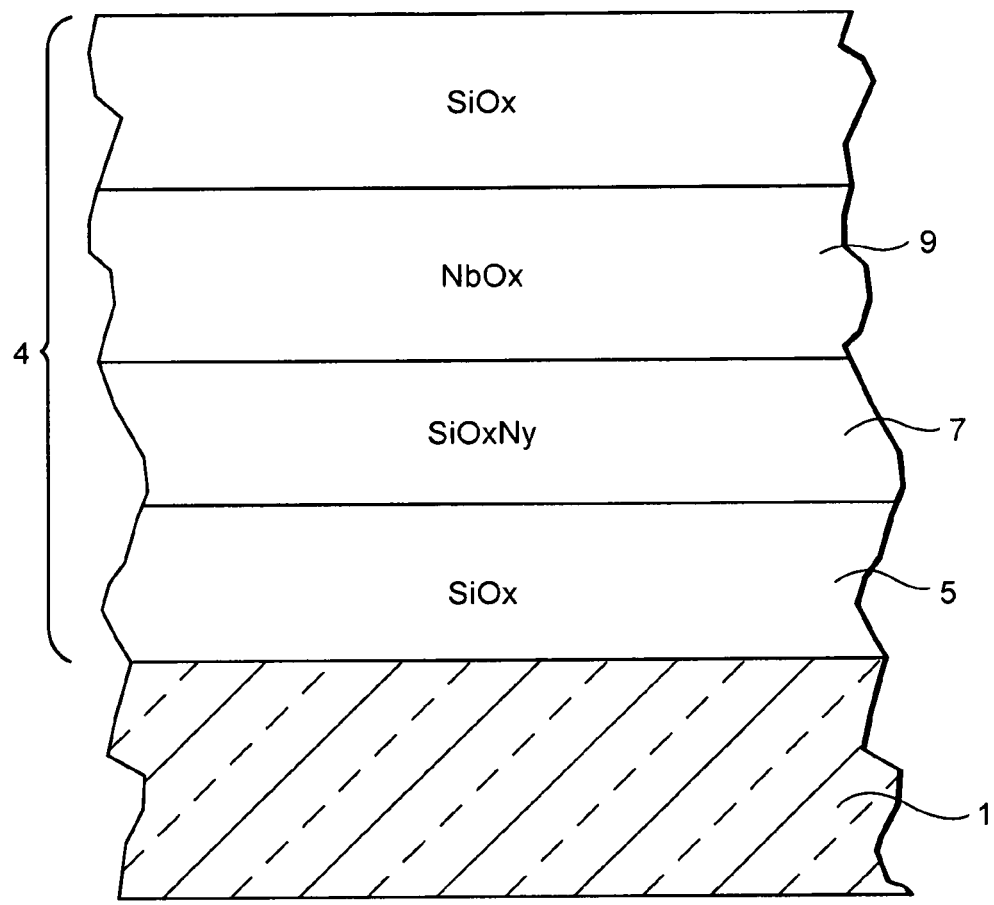
FIG. 3 is a cross-sectional view of a four-layered antireflection coating according to other example embodiments.

FIG. 3 illustrates an exemplary example according to certain embodiments of this invention. FIG. 3 is a cross-sectional view of an example coated article according to an embodiment of this invention. The coated article of the FIG. 3 embodiment includes substrate 1 that supports heat treatable (e.g., temperable) anti-reflection (AR) coating 4. Substrate 1 is typically a glass substrate (e.g., clear, green, bronze, or blue-green glass substrate from about 1.0 to 10.0 mm thick), but may be other materials in certain example instances such as, for example, a polycarbonate or acrylic material, a silicon wafer, etc. The AR coating 4 includes an "index-matching" and/or "stress-reducing" layer 5 comprising silicon oxide, medium index layer 9 comprising silicon oxynitride, high index layer 9 comprising niobium oxide, and low index layer 11 comprising silicon oxide.

Figure 4:
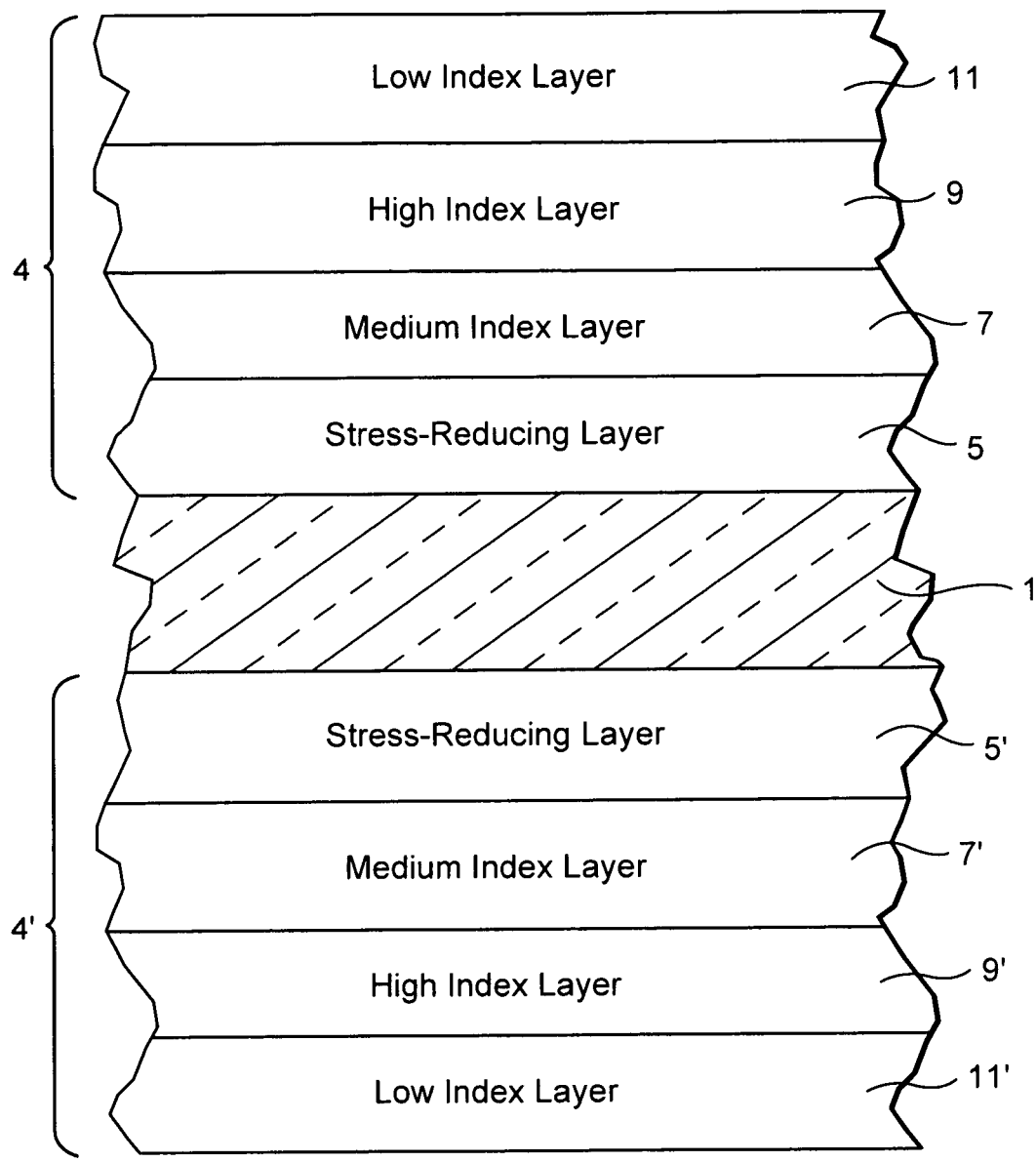
FIG. 4 is a cross-section view of a four-layered antireflection coating according to still further example embodiments.

FIG. 4 illustrates a further example embodiment of this invention. FIG. 4 is a cross-sectional view of a substrate supporting coatings on each of its major surfaces. AR coating 4 includes, from the substrate outwards, "index-matching" and/or "stress-reducing" layer 5, medium index layer 7, high index layer 9, and low index layer 11. AR coating 4' includes, from the substrate outwards, "index-matching" and/or "stress-reducing" layer 5', medium index layer 7', high index layer 9', and low index layer 11'.

It has advantageously been found that by seeking out high index materials with a low post-heat treatment tensile stress, and/or by increasing the magnitude of the contribution of compressive stress from additional layers in the stack, (e.g., a stress-reducing layer) it may be possible to reduce the net tensile stress in a coating, and thus produce a coating with an increased durability after heat treatment.

The layers described herein may be stoichiometric and/or substantially fully stoichiometric in certain example embodiments, whereas the layers may be sub-stoichiometric in different example embodiments. However, it will be appreciated any suitable stoichiometry may be used in connection with the any of the example layers described herein.

Although certain example embodiments have been described in connection with three-layer or four-layer AR coatings, other arrangements including, for example, more or fewer layers, also are possible and contemplated herein. For instance, certain example embodiments may incorporate a stress-reducing layer, a medium index layer, and multiple high/low alternating layers thereon.

Furthermore, in some instances, other layer(s) below, within, or above the illustrated coating 4 may also be provided. Thus, while the layer system or coating is "on" or "supported by" substrate 1 (directly or indirectly), other layer(s) may be provided therebetween. Thus, for example, the coating 4 of FIGS. 2 and/or 3 and the layers thereof may be considered "on" and "supported by" the substrate 1 even if other layer(s) are provided between layer 5 and substrate 1. Moreover, certain layers of the illustrated coating may be removed in certain embodiments, and other layers added in other embodiments of this invention without departing from the overall spirit of certain embodiments of this invention. In certain other example embodiments, coating 4 may consist essentially of layers 5, 7, 9 and 11, and layer 11 may be exposed to the atmosphere (e.g., layer 11 may be the outermost layer of the coating in certain example embodiments).

The example embodiments described herein may be used in connection with a variety of applications. For instance, a single-sided AR coating made according to the example embodiments described herein may be used for applications such as, for example, lights for commercial or residential areas or at sports or other large venues or arenas, lighting application in general, touch screens, etc. A double-sided AR coating made according to the example embodiments described herein may be used for applications such as, for example, electronics, displays, appliances, facades, etc. Of course, other applications also are possible for the example embodiments disclosed herein.

A coated article as described herein (e.g., see FIGS. 1-4) may or may not be heat-treated (e.g., tempered) in certain example embodiments. Such tempering and/or heat treatment typically requires use of temperature(s) of at least about 580 degrees C., more preferably of at least about 600 degrees C. and still more preferably of at least 620 degrees C. The terms "heat treatment" and "heat treating" as used herein mean heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, or up to about 10 minutes, in certain example embodiments.

Some or all of the layers described herein may be disposed, directly or indirectly, on the substrate 1 via sputtering or other suitable film formation technique such as, for example, combustion vapor deposition, combustion deposition, etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A heat treated coated article comprising:
a substrate; and
a first antireflection coating supported by a first major surface of the substrate, the substrate being heat treated together with the first antireflection coating disposed thereon,
wherein the first antireflection coating comprises, in order moving away from the substrate:
  a stress-reducing layer comprising a material having a compressive residual stress after heat treatment,
  a medium index layer comprising silicon oxynitride,
  a high index layer comprising an oxide of niobium, and
  a low index layer comprising an oxide of silicon,
wherein the first antireflection coating has a net compressive residual stress after heat treatment.

2. The coated article of claim 1, wherein
the stress reducing layer comprises an oxide of silicon.

3. The coated article of claim 1, wherein
a refractive index of the stress-reducing layer differs from a refractive index of the glass substrate by no more than about 0.2.

4. The coated article of claim 1, further comprising
a second antireflective coating provided on a second major surface of the substrate, the second antireflective coating comprising the same layers as the first antireflective coating.

5. A heat treated coated article, comprising:
a glass substrate; and
an antireflection coating supported by a major surface of the substrate, the substrate being heat treated together with the antireflection coating,
wherein the antireflection coating comprises, in order moving away from the substrate:
  a stress-reducing layer comprising an oxide and/or nitride of silicon,
  a medium index layer comprising silicon oxynitride,
  a high index layer comprising an oxide of niobium and/or an oxide of titanium, and
  a low index layer comprising an oxide of silicon,
wherein the antireflection coating has a net compressive residual stress after heat treatment.

6. The coated article of claim 5, wherein
the net compressive residual stress measured after heat treatment differs from the value of $\sigma_{Net}$ by no more than about 15%, where $\sigma_{Net}$ is determined according to the equation:

$$\sigma_{Net} = \frac{\sigma_1 h_1 + \sigma_2 h_2 + \ldots + \sigma_n h_n}{h_1 + h_2 + \ldots + h_n},$$

where $\sigma_n$ is the residual stress of the $n^{th}$ layer, and $h_n$ is the thickness of the $n^{th}$ layer.

* * * * *